United States Patent [19]

Schneider et al.

[11] Patent Number: 4,895,905

[45] Date of Patent: Jan. 23, 1990

[54] GEL-TYPE CHELATING RESINS AND A PROCESS FOR REMOVAL OF MULTI-VALENT, ALKALINE EARTH OR HEAVY METAL CATIONS FROM SOLUTIONS

[75] Inventors: Hans P. Schneider, Stade; Ulrich Wallbaum, Dollern, both of Fed. Rep. of Germany

[73] Assignee: The Dow Chemical Company, Midland, Mich.

[21] Appl. No.: 153,688

[22] Filed: Feb. 8, 1988

[51] Int. Cl.$^4$ .................. C08F 257/02; C08F 112/08; C08F 8/40

[52] U.S. Cl. ........................................ 525/154; 521/32; 525/242; 525/333.5; 525/333.6; 525/902; 423/22; 423/24; 423/89; 423/99

[58] Field of Search ..................... 525/242, 154, 333.5, 525/333.6, 902; 521/30, 32

[56] References Cited

U.S. PATENT DOCUMENTS

| | | | |
|---|---|---|---|
| 4,002,564 | 1/1977 | Carbonel et al. | 521/30 |
| 4,442,237 | 4/1984 | Zimmerman et al. | 521/154 |
| 4,564,644 | 1/1986 | Harris | 521/28 |
| 4,797,187 | 1/1989 | Davis et al. | 521/32 |
| 4,818,773 | 4/1989 | Cornette et al. | 521/32 |

FOREIGN PATENT DOCUMENTS 2947 9/1983 PCT Int'l Appl. .

OTHER PUBLICATIONS

Derwent Abs. 87-136947/20 Obrecht et al, DE3540143.

*Primary Examiner*—Herbert J. Lilling

[57] ABSTRACT

Improved processes for the removal from solution of multi-valent alkaline earth metal and/or heavy metal cations are taught, having excellent combinations of cation capacity and resistance to bead breakage. The processes use specified polymer resin beads functionalized with chelating functionalities such as alkylaminophosphonic moieties or iminodiacetic acid moieties. The beads are prepared by the specified process to have a decreased amount of cross-linking in the shell area as compared to the core. An additional aspect of the invention is an improved gel-type chelating resin having core/shell morphology and alkylaminophosphonic functional groups which is found to exhibit surprising combinations of dynamic capacity, osmotic shock resistance, and physical strength. This chelating resin has been found to be very suitable for the removal of calcium from brine solutions prior to the use of such solutions in membrane electrolysis cells of chlorine production.

3 Claims, No Drawings

GEL-TYPE CHELATING RESINS AND A PROCESS FOR REMOVAL OF MULTI-VALENT, ALKALINE EARTH OR HEAVY METAL CATIONS FROM SOLUTIONS

The present invention relates to resin beads of a cross-linked polymer of gel-type having certain chelating functional groups and to a process for removal of multi-valent alkaline earth and/or heavy metal cations from solutions containing these cations.

It is well known in several areas of technology that multi-valent cations of the alkaline earth metals and heavy metals are desired to be removed from solutions either due to their value or to the detrimental effects they can cause. For example, there are situations where these cations are desired to be removed from the streams, to the greatest extent possible, prior to the (a) use of the liquid in chemical or separation processes, (b) consumption of the liquid or (c) release of the liquid into the environment.

Among the types of alkaline earth and heavy metal cations known to be either inherently valuable or detrimental in one or more of these types of situations are calcium, magnesium, strontium, barium, gallium, zinc, copper, nickel, mercury, uranium, aluminum, cobalt, lead, iron, chromium, cadmium or precious metals such as gold, silver, and platinum.

It has long been known that it is possible to exchange detrimental ions in a stream with more acceptable ions and/or chelate ions to remove them from the streams. In this regard there have been many developments made over the years in this area of specialized polymeric resins and specialized functional groups which can be chemically bound to such resins to provide improved systems for the removal of various anions and cations. Notwithstanding this activity it remains quite unpredictable which combinations of functional groups and polymeric resins will prove to be suitable for the removal of a particular ion or type of ion.

As an example situation, it is known that in the use of membrane electrolysis cells for the production of chlorine from salt solutions having a high concentration of chloride salts, the concentration of calcium ions and other divalent metal ions must be very low in the salt solutions for proper and efficient functioning of cells. Chelating resins have been suggested for the purification of concentrated salt solutions (brines). See, for example, U.S. Pat. Nos. 4,002,564 and 4,442,237 and PCT publication WO 83/02 947. In U.S. Pat. Nos. 4,002,564 and 4,442,237, gel-type resins having alkylaminophosphonic functional chelating groups have been used to remove divalent metal ions from salt solutions. It is a recognized problem with gel-type resins, however, that although being able to efficiently remove relatively large amounts of the divalent metal ions, they do not withstand osmotic shock conditions well enough to be used in product scale processes.

Osmotic shock conditions necessarily occur quite regularly to chelating resins of this type. When a resin has been in use removing the divalent metal ions, it becomes too saturated by the divalent ions it has removed to further remove the ions to the necessary degree. At this point it is treated in turn with acid, base, water and aqueous sodium salt solutions to regenerate the chelating functional groups. The forces which are put on the beads by this regeneration process (osmotic shock forces) are sufficient in the case of most gel-type resins with usual concentrations of functional sites, to cause the beads to physically break, requiring replacement of the resin after only a few regeneration cycles.

In PCT publication WO 83/02 947 it is reported that macroporous resins beads with the alkylaminophosphonic functional groups possess much better resistance to osmotic shock and are therefore preferred for use in removal of calcium and other divalent metal ions to purify the brines for use in membrane electrolysis cells. The resins can therefore be regenerated a greater number of times. It has been found that although these resins have the theoretical capacity to chelate relatively large amounts of calcium or similar ions, the ability of the resins to chelate the ions decreases rapidly when an ion-containing solution is passed continuously over the resin and only a fraction of the theoretical capacity is used until the resin is no longer capable of absorbing. This is referred to as low "dynamic capacity" and makes the performance of the macroporous resins as taught in WO 83/02 947 unsatisfactory for large scale brine purification since regeneration is required too frequently.

It view of these deficiencies it is the object of the present invention to provide a chelating process and gel-type resin having improved dynamic capacity and being sufficiently resistant to alternating osmotic stress and compressive stress so that it can be used for removal of alkaline earth and heavy metal ions from solutions in production scale processes.

The object is solved by a process for reducing the concentration of multi-valent alkaline earth or heavy metal cations in a solution comprising contacting the solution with an amount of functionalized, gel-type resin beads characterized in that the beads (i) have a decreased level of cross-linkages in the shell area as compared to the core area; (ii) are prepared by (a) forming a suspension of a plurality of cross-linked polymer matrixes containing polymerization-initiating free radicals, (b) contacting said cross-linked polymer matrixes with a monomer feed which is at least partially imbibed by said polymer matrixes and (c) polymerizing said monomer; and (iii) are functionalized with chelating functionalities. Particularly useful are resins having alkylaminophosphonic functional groups of the formula $-CH_2-NR-CR^1R^2-PO_3H_2$ wherein R is hydrogen, $CR^1R^2-PO_3H_2$ or $-CH_2COOH$ and independently $R^1$ and $R^2$ are hydrogen and/or an alkyl group having one to five carbon atoms.

The invention also includes a gel-type chelating resin comprising beads of a cross-linked polymer resin having chelating functional groups, characterized in that the beads (i) have a decreased level of cross-linkages in the shell area as compared to the core area, (ii) are prepared by (a) forming a suspension of a plurality of cross-linked polymer matrixes containing polymerization-initiating free radicals, (b) contacting said matrixes with a monomer feed which is at least partially imbibed by said matrixes and polymerizing said monomer, and (iii) have functional groups of the alkylaminophosphonic, isothiouronium, mercaptomethyl and/or dithiocarbamate types.

The use according to the invention of the chelating resin beads for reduction of the concentration of multi-valent alkaline earth or heavy metals in solutions comprises contacting the solution with the resin beads. Preferably aqueous salt solutions are contacted with said beads. A more preferred embodiment of the invention relates to the treatment of concentrated brine which should be used for the preparation of chlorine with membrane electrolytic cells. The subclaims describe preferred embodiments of the invention.

Fundamental ion exchange technology (i.e., the general methods and apparatuses for using functionalized polymeric resin beads to reduce concentrations of ions in salt solutions) is well-known in the art and is described in the book "Ion Exchange", F. Helfferich, McGraw-Hill Book Co., Inc. 1962. According to this invention, a very specific type of polymer resin beads having chelating functionalities are used in such methods and apparatuses to reduce the concentration(s) of one or more multi-valent alkaline earth or heavy metal cations and a surprising level of capacity and selectively has been observed.

In the different situations where this process can be used the specific cation or cations may be of interest for further processing themselves or as an impurity in a stream. This process is especially applicable to the chelation of the alkaline earth and/or heavy metal cations of the elements listed in the periodic table in columns 1B, 2A, 2B, 4A and 8B. It can also be applied to the elements of 3A, 3B and 6B. Examples of the multi-valent cations which can be at least partially removed in accordance with this invention include alkali earth cations such as calcium, magnesium, strontium and barium, as well as other metal cations such as iron, gallium, zinc, copper cobalt, nickel, mercury, lead, uranium, aluminum, chromium, cadmium or the precious metals such as gold and platinum. Preferably, this process is used to remove bi-valent ions and most preferably calcium, magnesium and the other alkali earth cations.

Depending on the particular chelating functionality used, the process can be effective to remove all such multi-valent cations from a stream or, by choice of an appropriate functional chelating group, to select only a desired ion or group of ions. Examples of suitable chelating functionalities are alkylaminophosphonic, isothiouronium, mercaptomethyl (i.e. thiol), iminodiacetic, picolylamino, dipicolylamino, picolyl(2-hydroxyethyl-)amino, polyamino, (8-hydroxychinoly)alkylamino, (2-hydroxyphenyl)amino, S-bonded dithizonyl, guanidino, dithiocarbamate, hydroxamic, and amidoxime. Preferred functionalities are alkylaminophosphonic, isothiouronium, mercaptomethyl and dithiocarbamate. Particularly preferred are alkylaminophosphonic groups.

Typically the process and/or resin according to the invention are effective to remove ions where their concentration in solution is at least 0.02 milligrams per liter (mg/l), preferably at least 0.05 mg/l. More preferably the invention is used when the ion concentration is in the range of 1 to 10 mg/l.

Polymer beads suitable for use according to this invention are described in detail in European patent application No.101 943. As described therein the cross-linked copolymer beads exhibiting a core/shell morphology are prepared by contacting (a) a suspension of cross-linked polymer matrixes, preferably with an average diameter of 10 to 750 microns, in the presence of suspending agent with (b) a substantially continuous-addition monomer feed which is at least partially imbibed by said polymer matrixes and, when polymerized, forms 40 to 90 percent by weight of the resin beads. Free radical polymerization is initiated only be free radicals already contained in the polymer matrixes to polymerize such additional monomer while no additional free-radical initiation is done. In this manner the copolymer beads having an average diameter in the range of 50 to 200 microns and exhibiting a core/shell morphology are prepared. These beads have high crush strength and excellent resistance to osmotic shock. By the term "core/shell morphology" it is meant that the polymeric structure of the copolymer beads changes from the inside to the outside of the bead. Such changes in polymeric structure may be somewhat gradual yielding a bead having a gradient of polymeric structure along the radius. Alternatively, said changes in polymeric structure may be relatively abrupt as one moves along a radius of the bead outward from the center. The effect in any case is that these gel-type resin beads have a relatively distinct core having one polymeric structure and a relatively distinct core having one polymer structure and a relatively distinct shell having another polymeric structure.

The core/shell morphology of the copolymer beads is detectable using known techniques for determining the structure of polymeric materials. In general, one or more of the following techniques, among others can be suitably employed to determine the core/shell morphology of the copolymer beads and the chelating resin beads of the invention: dynamic thermal analysis, differential thermal analysis, osmium staining techniques, measurement of the respective refractive indices of the core and shell of the copolymer beads, conventional transmission electron microscopy, analytical transmission electron microscopy, scanning transmission electron microscopy, and other suitable techniques. In addition, the beads of this invention often exhibit symmetrical strain patterns which are detectable by examination of the beads under polarized light. Often, the core/shell morphology of the copolymers as well as the resin beads of this invention is discernible simply from a visual inspection of the beads with no or low magnification. The core is then seen as an area of different color or as a darker or lighter area than the shell.

The core/shell copolymer beads formed in this manner preferably have a shell containing a lower proportion of cross-linking monomers than the core. In this way, beads of this type will have a shell which is softer (less friable and more elastic) than the core of the bead. This permits the bead to distribute energy throughout its structure when subjected to external stresses and pressures while retaining its shape and integrity. It is believed that this improves the crush strength and resistance to osmotic shock of such core/shell resin beads. In addition to the difference in cross-link densities of the core and shell, the polymer in the shell can advantageously have a higher molecular weight than the polymers of the core. This also can impart mechanical strength to the bead and increase its resistance to osmotic shock.

It has been found that these types of resin beads, while recognized to have good strength properties, have surprisingly good selectively and capacity, when functionalized with chelating moieties, to remove multi-valent cations of alkaline earth metals and heavy metals. Although not limiting the claims or scope of the present invention, it is theorized that this process for preparing the resin beads results in the polymer shell around the beads having ideal combinations of polymer molecular weight, cross-linking, and porosity for functionalization with chelating groups and contacting and removing maximum amounts of these specific ions.

After having prepared the cross-linked resin beads, typically of styrene-divinylbenzene copolymer, they are functionalized by known techniques with chelating moieties such as, for example, by the techniques described in U.S. Pat. No. 2,888,441. Suitable chelating moieties can be chosen according to the type of multivalent alkaline earth or heavy metal cation that is desired to be removed. See, for example, the Encyclopedia of Polymer Science and Engineering, 2nd Edition, 1985, J. Wiley and Sons, Publisher, at volume 3, pages 363–366.

It is especially preferred according to the present invention to functionalize aromatic moieties of the resin beads as described above with alkylamino phosphonic moieties for use in removing ions of calcium from solutions. After having prepared the cross-linked polymer beads, functional alkylaminophosphonic groups are introduced by a process such as those described in PCT Publication WO 83/02 947 and U.S. Pat. Nos. 4,002,564 and 4,442,231. The usual steps involve an initial chloromethylation of the copolymer followed by amination, hydrolysis and alkylphosphonation. As is known in the art, the capacity of the resins can be optimized by the selection of reactants and the conditions of reaction such as temperature, duration and reagent concentrations, in these steps.

By whichever process is used, it is essential in this preferred aspect of the present invention that the alkylaminophosphonic groups as exemplified by the following general formula are introduced into the copolymer beads:

$$-CH_2-NR-CR_1R_2-PO_3H_2 \qquad I$$

wherein R is H, $-CR_1R_2-PO_3H_2$ or $-CH_2COOH$, $R^1$ and $R^2$ are independently $-H$ and/or alkyl having 1 to 5 carbon atoms.

The process for removing multi-valent cations of alkaline earth and heavy metals according to the present invention have been found to be unexpectedly improved over the prior art process due to the superior combinations of dynamic capacity, osmotic shock resistance and mechanical crush resistance. This combination of properties is especially essential for commercial scale processes and resins which are to be used in the purification of concentrated aqueous salt solutions such as brines. Among other uses, salt solutions (brines) can then be supplied to membrane electrolysis cells for chlorine production. For this process of brine purification according to the present invention, the calcium concentration must be reduced to levels of less than 50 parts per billion (0.05 mg/l) in large quantities of highly concentrated brine solution. After their use, the resins are regenerated by treatment with acid, caustic, and concentrated salt solutions which produce severe osmotic strain or shock on the structure of the copolymer beads. Thus, the excellent osmotic and mechanical strength which the resin beads for use in this invention are found to possess must be accompanied by a large capacity and/or selectively, especially for calcium and magnesium ions for this particular application.

It has been found that a large equilibrium capacity of a chelating or ion exchange resin does not necessarily mean that the dynamic capacity will be sufficient for commercial use of such resin. The total equilibrium capacity is measured under ideal conditions and gives the total capacity available. Under actual performance conditions, for various reasons, only a portion of the total capacity is used in removing ions from the solution to be purified. At some point as the whole capacity is being used, the rate of ion removal becomes too low and unacceptable levels of ions remain in the solution as it leaves the resin bed. The dynamic capacity (as this term is used herein) of a resin is therefore a better measure of its performance under actual ion exchange or chelating conditions. It is desirably a large portion of the total equilibrium capacity. With the resins according to the present invention, it has been found that the dynamic capacity is a surprisingly large fraction of the total equilibrium capacity. As used herein, the "dynamic" capacity and the "total" or "equilibrium" capacity are measured according to the test method described below in connection with the experiments.

The process for multi-valent alkaline earth or heavy metal removal according to the present invention should use functionalized resin beads as described above, which have a total capacity for such ions (as tested by the method described herein) of at least 0.1 equivalents of ions per liter resin (when the resin is in the Na form), preferably a capacity of at least 0.5 equivalent ions per liter resin, more preferably at least 0.75 and most preferably from 0.75 to 2.5. It is additionally necessary for such resins to have a dynamic capacity for such ions of at least 0.07 equivalents of ions per liter resin and preferably of at least 0.3, more preferably 0.5 and most preferably in the range of 0.5 to 1.0.

In general, the chelating resins according to the present invention will have total capacities as tested by these methods of greater than 15 grams calcium per liter resin and preferably greater than 20 (determined by the mentioned methods). It has been found desirable for the alkylaminophosphonic chelating resins which are to be used under these conditions to have a dynamic calcium capacity of 10 grams of calcium per liter resin when the resin is in the sodium form. Preferably the dynamic capacity is greater than 15 grams calcium per liter resin. As used herein the equivalent weight of calcium for purposes of chelation by alkylaminophosphonic groups is assumed to be 20 grams per equivalent.

It has been found especially desirable and advantageous with regard to the dynamic capacity of the resins used in the present invention to operate the process on solutions at elevated temperatures (above room temperature). Surprisingly improved dynamic capacities compared to prior art resins are observed. Temperature above 25° C., for example, are suitable and it is preferred to operate on solutions above 40° C., more preferably above 50° C.

In combination with the excellent dynamic capacities exhibited by the resins according to this invention, there is also observed outstanding osmotic shock resistance. Under the osmotic shock test conditions similar to those described in DIN method 54,406, it has been found desirable that greater than 90 percent of the beads remain unbroken after 50 cycles of 4 molar HCl, water, 4 molar NaOH, and water. It is preferred that more than 95 percent of the beads remain unbroken and very desirable for more than 98 percent of the beads to remain unbroken after these conditions of osmotic shock.

It is also important for these resins, which will be used in large quantities, to exhibit good resistance to mechanical forces. It has been found necessary that such chelating resins exhibit an average crush strength of greater than 800 grams (g) per bead, preferably greater than 1000 g per bead. In the following experiments, chelating resins according to the present invention are prepared and their excellent combinations of performance and strength exhibited. In the following examples, several test procedures will be used to evaluate these resins. In the examination of the resin beads to determine the bead morphology, an electron scanning microscope is used. To determine the total or equilibrium calcium capacity of a resin, a brine at 60° C. containing a known calcium concentration of about 1.5 parts per billion dissolved calcium is passed through a bed of the sodium form of the resin at 30 bed volumes of brine per hour until the calcium concentration in the effluent is the same as the calcium concentration in untreated brine. The pH of the brine is between 10 and 12. The resin bed is then regenerated by removal of the chelated calcium. The calcium which has been chelated by the resin is then determined by analysis of the solution which has been used to generate the resin.

In this and other capacity measurements, the capacity data is based on the resin bed volume determined after free setting of the resin in brine, when the resin is in the sodium form (i.e., the form have the largest volume).

The dynamic capacity for a resin was determined using the sodium form of the resin at a pH of 10 to 12. The resin was transferred to a column equipped with a heating jacket. A chemically pretreated brine containing up to 2 milligrams calcium per liter of brine was passed through the resin at a desired constant flow rate and temperature. During the run the column effluent was monitored for calcium by coloimetry. This was done in order to determine when the resin bed was no longer removing the calcium to a sufficiently low level. This endpoint was set at 0.05 milligrams calcium per liter brine. With the resins according to the invention the calcium concentration was below 0.02 milligrams calcium per liter brine for most of the cycle. When the endpoint of 0.05 milligrams calcium per liter brine was reached in the effluent, the regeneration of the resin was initiated by treating it with acid, deionized water and caustic. The solutions which were thus collected from the column were analyzed for calcium and the value for the resin dynamic capacity was calculated. These tests were done at 25° C. and 60° C. at a flow rate of 30 bed volumes of brine per hour.

The relationship between the dynamic capacity and the total capacity shows a high percentage utilization of capacity is achieved according to this invention.

The resins were tested for osmotic shock in a test similar to the proposed DIN method 54406. In the test used in the present experiments, however, the beads were subjected to 50 cycles of osmotic shock instead of 100 and one cycle consisted of treatment with 4 molar HCl, water, 4 molar NaOH, and finally with water instead of the 2 molar solutions.

EXPERIMENT 1

Resin bead preparation.

Copolymer beads having a core/shell morphology are prepared according to the description of EP 0 101 943. They are prepared by initially forming a suspension of matrixes of a cross-linked polymer of styrene and divinylbenzene (seed particles) and continuously supplying to this suspension and additional monomer feed of styrene (98.5 percent) and divinylbenzene (1.5 percent). This is done under conditions such that polymerization initiating free radicals existed in the suspended cross-linked poly(styrene-divinylbenzene) matrixes but during the final additional monomer addition no further free-radical initiator is added. At least a portion of the additional monomer feed is imbibed by such matrixes. This additional monomer is polymerized to provide additional polymer both in existing matrix and as a shell. In this way gel-type resin beads having core/shell morphology are formed having a decreased level of crosslinkages in the shell area as compared to the core. The beads had a granulometric distribution between 250 and 600 microns.

Functionalization.

Chloromethylation was accomplished under appropriate safety procedures by the addition of 740 weight parts of chloromethylmethylether with 146 weight parts of the styrene/divinylbenzene copolymer in an agitated reactor. 44 weight parts ferric chloride were added to the mixture and the temperature was raised to 50.5° C. for 3 hours. The reaction mixture was then cooled to 13° C., the excess ether was removed and the chloromethylated copolymer was treated with methanol several times.

In the amination step the chloromethylated beads were swollen for 45 minutes in about 500 weight parts formaldehydedimethylacetal. Then 311 weight parts hexamethylenetetramine were rinsed into the mixture with about 150 weight parts of water. The temperature of the mixture was then raised to slightly less than the boiling point (43.5° C.) and maintained for 6 hours. The resultant aminated resin was washed thoroughly with water yielding 425 weight parts of a yellow resin. The resin was submitted to hydrolysis with about 620 weight parts of aqueous 16 percent hydrochloric acid. This mixture was stirred at 45° C. for 4 hours and subsequently washed thoroughly with water until neutral reaction, yielding the polybenzylamine resin.

In the phosphonation step 390 weight parts of a 70 percent aqueous phosphoric acid solution, 101 weight parts paraformaldehyde, and at least 200 weight parts of a 32 percent aqueous hydrochloric acid solution were added to the slurry of the polybenzylamine resin in 340 weight parts water. The mixture was maintained at 90° C. for three hours and rinsed with water afterwards. The yield was about 300 weight parts of a aminoalkylphosphonic functionalized resin.

Chelating Resin Evaluation.

This resin was then evaluated and the total capacity found to be 23.2 grams calcium per liter of resin in the Na form (gr Ca/l). Using a typical ion exchange column, brine solution having a pH of 10 to 12 and temperatures of 25° C. and 60° C., containing less than two milligrams calcium, was contacted with 0.2 liters of alkylaminophosphonic chelating resin. The brines were passed through the column at a rate of 30 bed volumes per hour (BV/h). Under these conditions the dynamic capacity for calcium was found to be about 3.8 grams calcium per liter resin at 25° C. and about 17.8 grams calcium per liter resin at 60° C. As shown below in Table I this resin, identified as Exptl. Resin No. 1 is clearly a surprising improvement over the chelating capacity of typical gel-type or macroporous resins having similar functionalities. Moreover, as can also be seen in Table I the osmotic shock resistance and crush strength of the resin according to the invention are substantially better than the prior art gel-type resin having the same functionality.

TABLE I

Alkylaminophosphonic functionalized chelating resins

| | Total Capacity[1] | Dynamic Capacity[1] 25° C. | Dynamic Capacity[1] 60° C. | Osmotic Shock Resistance[2] 50 cycles |
|---|---|---|---|---|
| Exptl. Resin No. 1 | 23.2 | 3.8 | 17.8 | 100% |
| *Macroporous[3] | 14.4 | 4.8 | 9.5 | 90% |
| *Gel-type[4] - 1.8% DVB | 8.8 | 1.1 | 6.2 | 75% |
| 3.0% DVB | 28.6 | 1.4 | 12.8 | 50% |
| 5.7% DVB | 9.5 | 0.7 | 6.0 | 80% |

[1]Capacity in grams calcium per liter resin.
[2]Percentage beads remaining unbroken.
[3]Macroporous resin generally according to PCT Publication WO 83/02947, commercially available from Duolite under the tradename ES 467.
[4]Gel-type or microporous resin generally according to USP 3,288,846, with the weight percentage of divinylbenzene cross-linking agent (DVB) specified.
*Comparative Example, not an example of the present invention.

EXPERIMENT 2

Resin beads were prepared according to the method of Experiment 1 and chloromethylated and aminated as described therein. Iminodiacetic acid moieties were prepared onto this resin by treatment of a polybenzylamine intermediate, prepared as described above, with sodium chloroacetate. 100 weight parts of the wet aminated resin were suspended in a freshly prepared solution of 303 weight parts sodium chloroacetate in 430 weight parts of water. The pH value was maintained alkaline during the reaction. The reaction temperature was kept at 75° C. for four hours. After washing with water the yield was 164 weight parts of the iminodiacetic acid resin. A gel-type resin containing 1.8 percent DVB (see Table II) was functionalized with a similar procedure. The results of the evaluation of the resin according to this invention (Exptl. Resin No. 2), the comparative gel-type resin and a comparative, commercial macroporous resin are shown in Table II.

TABLE II

Iminodiacetic acid functionalized chelating resins

| | Total Capacity[1] | Dynamic Capacity[1] 25° C. | Dynamic Capacity[1] 60° C. | Osmotic Shock Resistance[2] (50 cycles) |
|---|---|---|---|---|
| Exptl. Resin No. 2 | 7.2 | 2.2 | 4.2 | 99.5 |
| *Macroporous[3] | 14.2 | 1.9 | 4.2 | 78.0 |
| *Gel-Type[4] - 1.8% DVB | 4.3 | 1.6 | 2.7 | 86.4 |

[1]Capacity in grams calcium per liter resin.
[2]Percentage beads remaining unbroken.
[3]Macroporous resin generally according to the description of Ullmann's Encyklopadie der Technischen Chemie, 34 Ed., Vol. 13, p. 304, commercially available from Bayer under the tradename OC 1048.
[4]Gel-type of microporous resin generally according to USP 3,288,846.
*Comparative Example, not an example of the present invention.

As can be seen in Tables I and II above, the multivalent alkaline earth metal cation removal process according to the present invention shows surprising improvements in dynamic capacity over prior art processes using gel-type resins which would be expected to have a higher capacity. Moreover, the process according to the invention can remove larger amounts of cations with the same or less bead breakage than the prior art processes using macroporous resin beads which would be expected to exhibit low levels of bead breakage. The use of elevated temperatures gives further benefits as compared to the prior art. Particularly it is an advantage to maintain elevated temperatures for the purification of brine.

EXPERIMENT 3

The alternative functionalization process of U.S. Pat. No. 3,925,264 was also used to prepare the polybenzylamine resin as intermediate product using a styrene/divinylbenzene copolymer resin according to Experiment I. 50 weight parts of the core/shell resin of Experiment I were swollen in 281 weight parts of 1.2-dichloroethane. 180 weight parts of N-hydroxymethylphthalimide were added to the mixture, followed by 5 weight parts of $FeCl_3$. The mixture was heated under reflux and 8.5 weight parts of water were removed from the reaction system by continuous dewatering. Another 5 weight parts of $FeCl_3$ were added and the reaction was stopped after removal of 12 weight parts of water after a time of 10 hours reflux. The obtained resin was suspended in a mixture of 300 weight parts of water and 237 weight parts of methanol. The hydrolysis was carried out with 100 ml hydrazine hydrate and 144 weight parts of 45 percent aqueous NaOH at 85° C. for six hours. The generated phthalic hydrazine was washed out thoroughly. Subsequent the preparation of the polybenzylamine intermediate using the alkyl phosphonation procedure of Experiment I yield a chelating resin. The dynamic calcium capacity was determined to be 25.0 g Ca per liter resin in Na-form (at 60° C., at 30 BV/h). The asmotic shock resistance of this resin was, however, reduced somewhat compared with the resins which were prepared and functionalized according in Experiments I and II.

EXPERIMENT 4

The following Experiment demonstrates the effect of the resins according to the invention for the removal of several multi-valent metal cations from concentrated sodium chloride salt solutions. Alkylaminophosphonic functional chelating resin beads were prepared and functionalized according to the procedure described in Experiment 1.

The solutions indicated were prepared by dissolving the metal chlorides (except in the case of lead, where lead acetate was used) in the corresponding amount of purified brine of 25 weight percent content of NaCl. Adjustment of the pH-value was done with pure reagents (sodium hydroxide or hydrogen chloride). The brine comprising the metal ions in the indicated amounts was treated with the chelating resin according to the invention at 60° C. Samples were taken from the effluent of the column at the indicated time. The amount of each of the multi-valent cations in the feed and effluent were determined by the method of inductively coupled plasma (ICP) spectroscopy, except that the lead contents were determined by polarography.

Table III shows that magnesium was removed from the brine similarly to calcium. The value of 60 ppb Mg after 210 minutes at a rate of 50 bed volumes per hour gives evidence of the improved characteristics of the resin especially in case of low residence time of the brine.

As shown in Table III, it has also been found that the resin according to the invention has a high effectively for copper, zinc, lead and iron. The starting concentrations were reduced by the order of 600, 4700, 2400 and 200, respectively. It is surprising that the concentrations of lead and zinc were reduced to values close to or lower than the limits of detection. This demonstrates that the described resin is especially useful for the removal of important elements that contribute to environmental pollution. It can also be seen that bi-valent ion chelation is somewhat better than tri-valent ion chelation.

TABLE III

Removal of Cations from Brines

| Metal Ion | $Mg^{2+}$ | $Mg^{2+}$ | $Ca^{2+}$ | $Cu^{2+}$ | $Zn^{2+}$ | $Pb^{2+}$ | $Fe^{3+}$ |
|---|---|---|---|---|---|---|---|
| Rate of flow (BV/h) | 20 | 50 | 30 | 10 | 10 | 10 | 10 |
| pH-value of the brine | 10.5 | 10.5 | 10.5 | 3.0 | 3.0 | 3.0 | 3.0 |
| NaCl-concentration (g/l) | 300 | 300 | 300 | 300 | 300 | 300 | 300 |
| Metal Ion content of the supplied brine (microgram/kg) (ppb) | 2000 | 2000 | 2000 | 25400 | 23600 | 121000 | 13800 |
| Metal Ion Content of the effluent after 60 min. (microgram/kg) (ppb) | 7 | 45 | 10 | 40 | 5 | 50* | 75 |
| Metal Ion Content of the effluent after 210 min. (microgram/kg) (ppb) | 5 | 60 | 10 | 40 | 8 | 50* | 70 |

*Minimum level of detection

EXPERIMENT 5

The following Experiment demonstrates the effect of the resins according to the preset invention in removing several additional types of multi-valent metal cations. Alkylaminophosphonic functional chelating resins were prepared and functionalized according to the procedure described in Experiment 1 above. Feed solutions were prepared containing the indicated amounts of the specified metal ions. The metal ions were obtained by dissolving the corresponding metal chlorides (except where chromium nitrate was used) in water. The pH of the feed solution was adjusted to the indicated value with sodium hydroxide or hydrogen chloride. The feed solution was then treated at a temperature of 60° C. at the indicated flow rate. The metal ion contents of the fed solution and the effluent solution (after 240 minutes) were measured by inductively coupled plasma (ICP). As can be seen in Table IV below, the levels of chromium, cadmium, cobalt and nickel were reduced to surprisingly low levels by the chelating resins according to the present invention, with the bi-valent ion chelation being especially effective. They were reduced by the order of 6.5, 10,000, 2,000 and 345, respectively. The effectiveness in reducing the level of the known pollutant cadmium is especially noteworthy.

TABLE IV

Removal of Cations from Water

| Metal Ion | $Cr^{3+}$ | $Cd^{2+}$ | $Co^{2+}$ | $Ni^{2+}$ |
|---|---|---|---|---|
| Rate of Flow (BV/h) | 10 | 10 | 10 | 10 |
| pH Value of Feed solution | 3 | 3 | 3 | 2 |
| Metal Ion Content of Feed (microgram per liter) | 13,000 | 51,600 | 28,300 | 24,500 |
| Metal Ion Content of Effluent After 240 min. (microgram per liter) | 2,000 | 5 | 13 | 71 |

EXPERIMENT 6

In this Experiment resin beads were prepared according to the procedure of Experiment 1 and functionalized with isothiouronium. Such groups are known in the art and typical applications include the removal of precious metals such as gold, silver or platinum. In preparing the functionalized resin beads, 50 milliliters of the chloromethylated copolymer beads as described in Experiment 1 were swollen in 200 milliliters of tetrahydrofurane for 40 minutes at room temperature in a 500 ml 3-necked flask with thermometer, stirrer, and reflux condenser. Then a slurry of 17.5 grams of thiourea in 80 milliliters methanol was added to the reaction mixture. The resulting reaction mixture was stirred for 14 hours at room temperature, then held at 50° C. for 8 hours, followed by a slow cooling back to room temperature. After 3 washes with 100 milliliters of methanol and 3 washes with 150 milliliters of water the yield was approximately 110 milliliters of chelating resin. The results of the chelating evaluation of this resin are shown below in Tables V and VI.

EXPERIMENT 7

In the following Experiment a mercaptomethyl (also referred to as thiol) functionalized chelating resin according to the present invention is prepared. Such chelating functionalities are typically employed for the removal of metals such as mercury and silver from solutions. The isothiouronium functionalized resin produced according to the procedure described above in Experiment 6 (90 milliliters) was suspended in 90 milliliters of water in a heatable 500 milliliter 3-necked round bottomed flash equipped with thermometer and stirrer. To this were added 180 milliliters of a 25 percent aqueous solution of sodium hydroxide and the resultant suspension held at 45° C. for 3 hours. Afterward, the resin was drained and washed and neutralized with warm water with a yield of 60 milliliters of the mercaptomethyl resin. The results of the chelating evaluation of this resin are shown in Tables V and VI below.

EXPERIMENT 8

The resin beads were prepared according to the procedure described in Experiment 1 and functionalized with dithiocarbamate groups. Such groups are typically employed for the removal of heavy metal cations, such as mercury and/or lead, from solutions. The polybenzyl amine intermediate was prepared according to the procedure described above in Experiment 1. After the hydrolysis, the washed resin (100 milliliters) is swollen in 100 milliliters tetrahydrofurane for 30 minutes at room temperature. An ice-cold solution of 36 grams of sodium hydroxide in 60 milliliters of water and 150 milliliters of ethanol was added to a 500 milliliter 3-necked glass flask together with 20 grams of ice. From a dropping funnel, 54.5 milliliters of carbondisulfide were added to the cold sodium hydroxide solution. The resin slurry was then combined with this mixture adding another 50 milliliters of tetrahydrofurane. This reaction mixture was then heated up to 60° C. and stirred at this temperature for 24 hours. After draining, the beads were washed with tetrahydrofurane, ethanol and water. The yield was 130 milliliters of dithiocarbamate-functionalized resin beads. The chelating evaluation of the resin beads is shown in Tables V and VI.

In the following Tables the chelating evaluation results obtained of the above-described resins were obtained according to the following procedures. The indicated metal cation solutions were prepared by solution of the corresponding metal salt in water to obtain the indicated metal ion concentrations. The salts used were iron sulfate, mercury chloride, silver nitrate, tetrachlorogold acid (i.e., $[AuCl_4]^-$) and copper chloride. In an evaluation of the dynamic efficiency of the chelating resins (Table V) 50 milliliters of the resin was placed in a glass column with a heating jacket and a bottom frit having a diameter of 2 centimeters. After the resin was washed to neutral, the prepared solution is run through the bed at a rate of 500 milliliters per hour (10 BV/h) at a temperature of 60° C. After 4 hours of continuous operation the effluent was analyzed by atomic adsorption spectroscopy or inductively coupled plasma spectroscopy (gold, silver, mercury, iron and copper) to determine the level of metal ions. This evaluation and its results are summarized below in Table V.

The resins prepared in Experiments 5 through 8 above were also tested for their static efficiency (Table VI). In this test 2 milliliters of the resin beads were suspended in a bottle containing 50 milliliters of the indicated aqueous solution of the metal cation at the indicated pH. The mixture was shaken at room temperature for 24 hours and the remaining solution analyzed to determine the amount of unchelated metal ion by atomic adsorption spectroscopy or inductively coupled plasma spectroscopy. From these analysis results the amount of chelated metal ion was calculated and is shown in Table VI. Further samples were similarly evaluated after 88 hours. From these results, the static capacities of the chelating resins were calculated and are also shown below in Table VI in equivalents of ion which can be chelated by a liter of the indicated chelated resin (eq/1).

As can be seen in Tables V and VI, the chelating resins according to the present invention which have been activated with various types of chelating functionalities are surprisingly effective in the removal of metal cations from aqueous solutions. The isothiouronium, mercaptomethyl and dithiocarbamate functionalities are particularly efficient in the removal of the multi-valent metal cations.

TABLE V

| Removal of Cations from Water (Dynamic) | | | |
|---|---|---|---|
| Experimental Resin No. | 6 | 7 | 8 |
| Metal Ion | $Au^{3+}$ | $Ag^+$ | $Hg^{2+}$ |
| pH Value in Feed Solution | 2 | 3 | 5 |
| Metal Ion Conc. In Feed Solution (mg/l) | 113 | 108 | 24 |
| Metal Ion Conc. in Effluent | | | |
| After 30 mins (mg/l) | <0.5* | <0.5* | <0.1* |
| After Four Hours (mg/2) | <0.5* | 0.6 | 1.7 |

*Minimum level of detection

TABLE VI

| Removal of Cations from Water (Static) | | | | |
|---|---|---|---|---|
| Experimental Resin No. | 6 | 7 | 8 | 8 |
| Metal Ion | $Au^{3+}$ | $Ag^+$ | $Hg^{2+}$ | $Hg^{2+}$ |
| pH Value in Treatment Solution | 2 | 3 | 5 | 5 |
| Metal Ion Conc. in Treatment Solution (mg/l) | 1000 | 2157 | 4012 | 4012 |
| Metal Ion Conc. in Treated Solution | | | | |
| After 24 Hours (mg/l) | <0.5* | 48 | 179 | 935 |
| After 88 Hours (mg/l) | <0.5 | 4 | 14 | 290 |
| Calculated Static Capacity (eq/l) | >0.13 | 0.5 | 0.5 | 0.46 |

*Minimum level of detection

We claim:
1. A gel chelating resin comprising beads of a cross-linked polymer resin having chelating functional groups, characterized in that the beads (i) have a decreased level of cross-linkages in the shell area as compared to the core area, (ii) are prepared by (a) forming a suspension of a plurality of cross-linked polymer matrixes containing polymerization-initiating free radicals, (b) contacting said matrixes with a monomer feed which is at least partially imbibed by said matrixes and polymerizing said monomer, (iii) have alkylaminophosphonic, isothiouronium, mercaptomethyl and/or dithiocarbamate functional groups, and (iv) have a resistance to osmotic shock such that when the beads are contacted with 50 cycles of alternating 4M HCl and 4M NaOH, greater than 90 percent of the beads remain unbroken.

2. The resin according to claim 1 wherein the functional groups are alkylaminophosphonic and are of the formula:

$$-CH_2-NR-CR_1R_2-PO_3H_2 \qquad \text{I}$$

wherein R is H, $CR_1R_2-PO_3H_2$ or $-CH_2COOH$, $R_1$ and $R_2$ are independently $-H$ and/or alkyl having 1 to 5 carbon atoms.

3. The resin according to claim 1 wherein the functional groups are isothiouronium, mercaptomethyl and/or dithiocarbamate.

* * * * *